A. H. R. FEDDEN AND L. F. G. BUTLER.
INDUCTION PIPE FOR RADIAL OR ROTARY INTERNAL COMBUSTION ENGINES.
APPLICATION FILED NOV. 30, 1920.

1,395,980. Patented Nov. 1, 1921.

Inventors
A. H. R. Fedden &
L. F. G. Butler
by Wilkinson & Ginsta
Attorneys.

UNITED STATES PATENT OFFICE.

ALFRED HUBERT ROY FEDDEN AND LEONARD FREDERICK GEORGE BUTLER, OF BRISTOL, ENGLAND, ASSIGNORS TO THE BRISTOL AEROPLANE COMPANY LIMITED, OF BRISTOL, GLOUCESTER, ENGLAND.

INDUCTION-PIPE FOR RADIAL OR ROTARY INTERNAL-COMBUSTION ENGINES.

1,395,980.          Specification of Letters Patent.          Patented Nov. 1, 1921.

Application filed November 30, 1920. Serial No. 427,385.

*To all whom it may concern:*

Be it known that we, ALFRED HUBERT ROY FEDDEN and LEONARD FREDERICK GEORGE BUTLER, both subjects of the King of England, and both residing at Bristol, in the county of Gloucester, England, have invented certain new and useful Improvements in Induction-Pipes for Radial or Rotary Internal-Combustion Engines, of which the following is a specification.

This invention is for an improvement in or modification of the induction pipe system as described in the specification of Letters Patent No. 1,323,685 dated 2nd December, 1919, for use with multi-cylinder internal-combustion engines of the radial or rotary type having a plurality of carbureters with a corresponding number of induction pipes, the arrangement being such that each induction pipe or conduit is appropriated to and solely supplies a group of cylinders so placed apart angularly or so "timed" that the induction periods of the various cylinders in the group do not overlap one another. The various induction pipes or conduits are conveniently constituted by an annular chamber having a core formed with spiral vanes to divide it into the desired number of spiral conduits, or alternatively the induction pipes or conduits may be annular.

According to this invention there is employed with each conduit of induction pipes as above-described, closure means situated between its inlet and one of its outlets nearest thereto so as to permit flow from the inlet in one direction only along the conduit. The closure means may take the form of a diaphragm inserted into or formed integrally with the conduit and it is preferably so shaped as to conform to the required direction of flow of the gases in the part of the conduit blocked by it.

In one construction the closure means may be constituted by a baffle plate, one for each conduit, situated immediately behind the outlet most remote from the inlet in the direction of flow of the gas, and it is preferably so shaped as to direct the gas into that outlet.

In a modified form the closure means is constituted by a deflector-plate, one for each conduit, situated immediately to one side of the inlet pipe, thereby converting a T-connection of the inlet pipe with its conduit into an L-connection. In a modified form of this construction, a small gap may be provided between the edge of the deflector-plate and the wall of the conduit, for the purpose hereinafter described.

In the accompanying drawings.

Figure 1:
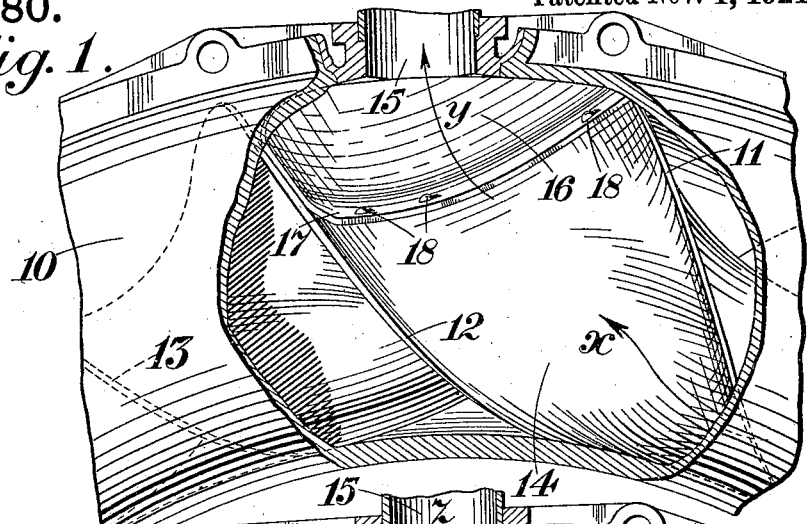
Figures 1 and 2 are perspective views with parts broken away showing the application of baffle plates adjacent an outlet pipe, to an induction pipe, having three spiral conduits as described in the said specification of Letters Patent No. 1,323,685.
Figure 2:
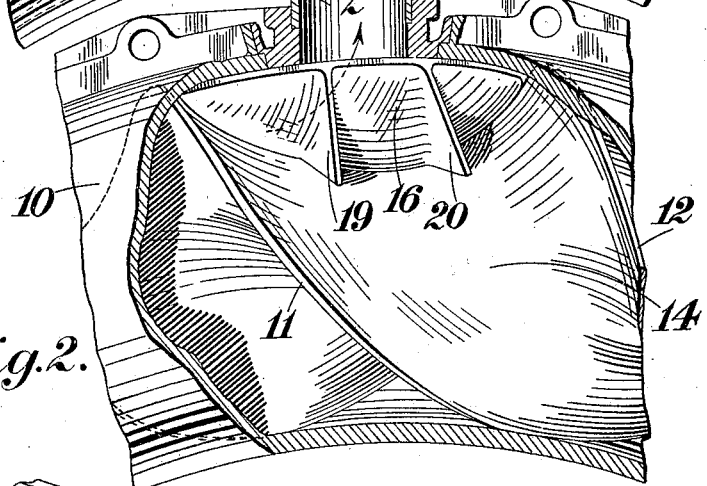

Referring first to Figs. 1 and 2, the induction-pipe 10 is provided with a core formed with three spiral vanes 11, 12, 13, which divide it into three spiral conduits, whereof one is shown at 14 in Fig. 1 by the breaking away of a portion of the pipe 10. Each of these conduits is supplied by a separate carbureter and supplies mixture to a group of cylinders, which as stated above, are so timed, or so spaced apart that their induction periods do not overlap. Communication is established between each of the various cylinders and its conduit by a pipe 15 registering with a suitable opening in the wall of the induction pipe 10.

According to one embodiment of this invention, a deflector-plate 16 is mounted in each of the spiral conduits 14, (and similarly in each of the other conduits) beside the outlet 15 which is farthest from the inlet in the direction of flow of the gases. This baffle-plate 16 is so shaped as to lie closely against the vanes 11 and 12 and the inner surface of the induction pipe 10 so as to effect a complete closure of the spiral passage 14. It is further so curved or shaped as to provide an easy path of flow for the gases from the said passage 14 into the pipe 15. The baffle-plate 16 is conveniently constituted by a piece of sheet metal curved in the manner just mentioned and provided with a flange 17 which lies closely against the two vanes 11 and 12 and is secured thereto by screws 18 or in any other convenient manner. Fig. 2 shows a back view of the baffle 16, shown in Fig. 1, and it will be seen that it is provided with two lugs 19, 20 which serve as buttresses to support it, these lugs being approximately of a triangular shape and seated along one edge on the vanes 11 and 12.

The direction of the flow of gases is indicated by the arrows $x$ and $y$ in Fig. 1 and $z$ in Fig. 2.

It will be observed that the part of the induction conduit between the back of the baffle 16 and the induction pipe is not used and could be dispensed with. Further, it is to be understood that the baffle-plate need not be formed as a separate part but it could be made integral with the core and vanes which are inserted in the pipe 10.

Figure 3:
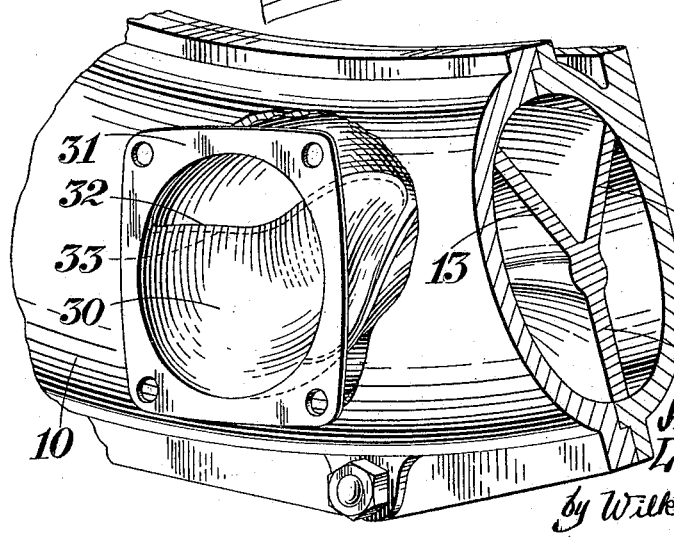
Fig. 3 is a similar view showing an alternative construction of baffle.

Referring now to Fig. 3, which illustrates a modified arrangement for the baffle-plate, the baffle is in this case mounted beside the inlet opening to each conduit in the induction pipe 10. In the construction illustrated the baffle or deflector is constituted by a plate 30, which is so shaped as to close the spiral conduit on one side of the inlet orifice thereto, and it is further so shaped as to provide an easy path of flow directing the gases which enter the pipe 10 at right-angles thereto into the spiral path which they are to follow around the pipe 10. The baffle-plate 30 may, as before, be formed integrally with the vanes on the core of the induction pipe, or, as illustrated, it may be formed integrally with a flange 31 which is secured to the induction pipe 10 around the inlet opening thereto. In this case the carbureter itself being bolted to the induction-pipe 10 holds the flange 31 in place.

In a modified construction of this invention a gap may be provided between the edge of the deflector-plate and the wall of the conduit, for example, by cutting away the part 32 of the plate to the dotted line 33. With this arrangement the dead end which exists at the back of the deflector-plate 30 is avoided, since the rush of gas into the conduit exerts an ejector effect on this gap and draws out the gas which has accumulated behind the plate. It will be understood that there is an accumulation of gas behind the plate owing to the inertia of the gases resulting from their constant flow around the induction pipe to the back of the plate.

It will further be understood that the deflector plates 30 by providing a suitable curved path for the flow of the gases facilitate their entry into the spiral pipe. Without these deflector-plates the gas enters through the inlet and impinges on the opposite wall of the spiral conduit almost at right-angles, thereby losing a considerable portion of its velocity.

While this invention has been described as applied to an induction pipe having spiral conduits, it is to be understood that it may be applied to any construction or arrangement of induction pipes lying within the scope of the claims of the above-mentioned Letters Patent No. 1,323,685.

What we claim as our invention and desire to secure by Letters Patent is:—

1. An induction pipe comprising in combination a plurality of endless conduits each arranged to supply a group of cylinders, means in each conduit situated between the inlet and one of the nearest outlets of the conduit so as to permit flow from the inlet in one direction only along the conduit.

2. An induction pipe comprising in combination a plurality of endless conduits spirally disposed about one another and each arranged to supply a group of cylinders whose firing periods are in sequence, means in each conduit situated between the inlet and one of the nearest oulets of the conduits so as to permit flow from the inlet in one direction only along the conduit and so shaped as to conform to the required direction of flow of the gas in the part of the conduit blocked by it.

3. An induction pipe comprising in combination a plurality of endless conduits spirally disposed about one another and each arranged to supply a group of cylinders whose firing periods are in sequence, a diaphragm inserted in each conduit between the inlet and one of the nearest outlets of the conduits so as to permit flow from the inlet in one direction only along the conduit and so shaped as to conform to the required direction of flow of the gas in the part of the conduit blocked by it.

4. An induction pipe comprising in combination a plurality of endless conduits spirally disposed about one another and each arranged to supply a group of cylinders whose firing periods are in sequence, a diaphragm formed integral with each of the conduits and situated between the inlet and one of the nearest outlets of the conduits so as to permit flow from the inlet in one direction only along the conduit and so shaped as to conform to the required direction of flow of the gas in the part of the conduit blocked by it.

5. An induction pipe comprising in combination an annular chamber wherein is formed a plurality of endless conduits spirally disposed about one another and each arranged to supply a group of cylinders whose firing periods are in sequence, a deflector plate in each conduit situated immediately to one side of the inlet pipe and so as to permit flow from the inlet in one direction only along the conduit and so shaped as to conform to the required direction of flow of the gas in the part of the conduit blocked by it.

6. An induction pipe comprising in combination a plurality of endless conduits spirally disposed about one another and each arranged to supply a group of cylinders whose firing periods are in sequence, a diaphragm inserted in each conduit between the inlet and one of the nearest outlets of the conduits so as to permit flow from the inlet in one direction only along the conduit and so shaped as to conform to the required direction of flow of the gas in part of the conduit blocked by it, and of such size as to leave a small gap between it and the wall of the conduit so as to permit a continuous circulation of gases.

In testimony whereof we have signed our names to this specification in the presence of two subscribing witnesses.

ALFRED HUBERT ROY FEDDEN.
LEONARD FREDERICK GEORGE BUTLER.

Witnesses:
J. STANLEY DANIEL,
D. RICHARD SMITH.